(No Model.)
E. G. DURANT.
BUILDING VENEER BOATS.
No. 272,663. Patented Feb. 20, 1883.
Fig. 1.
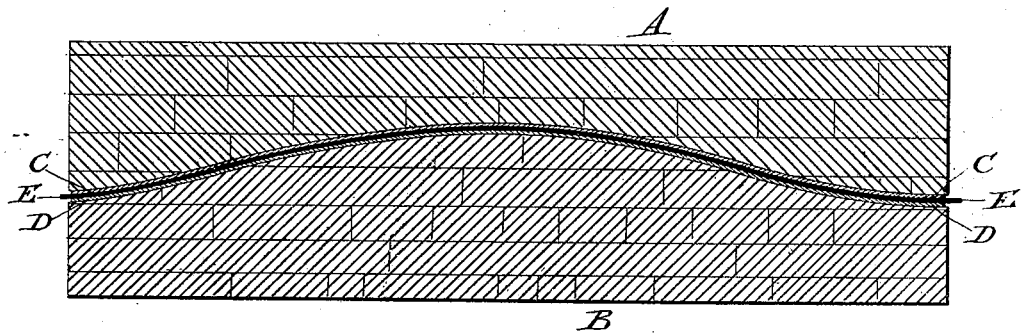
Fig. 2.  Fig. 3.
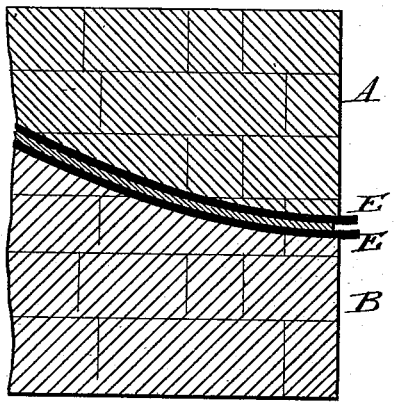 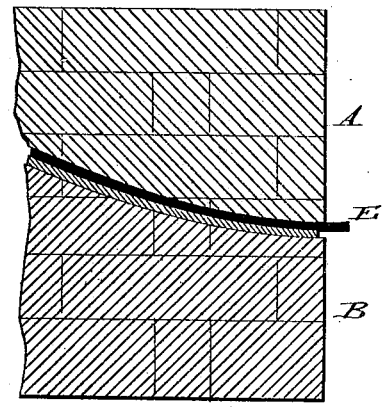
Fig. 4.
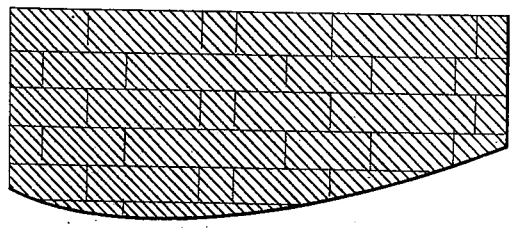
Attest.
Sidney P. Hollingsworth
William H. Shipley
Inventor.
E. G. Durant
By his attorney
Philip T. Dodge

UNITED STATES PATENT OFFICE.

EDWARD G. DURANT, OF RACINE, WISCONSIN.

BUILDING VENEER BOATS.

SPECIFICATION forming part of Letters Patent No. 272,663, dated February 20, 1883.

Application filed November 27, 1882. (No model.)

*To all whom it may concern:*

Be it known that I, EDWARD G. DURANT, of Racine, in the county of Racine and State of Wisconsin, have invented certain Improvements in Methods of and Appliances for Manufacturing Laminated Boats, of which the following is a description.

The present invention relates to improvements upon the method and apparatus set forth in Letters Patent No. 250,717, granted to me on the 13th day of December, 1881.

The principal objects of the present invention are to avoid the difficulty which has hitherto been encountered in securing the proper union of the several layers of veneer with each other at all points.

To this end the invention consists, first, in the employment, in connection with the two rigid counterparts of the molds by which the veneers are bent into form and compressed together, of an elastic surface or surfaces whereby a yielding pressure is applied to the veneers at all points; second, in the employment, in connection with the molds and the layers therein, of an absorbent surface or surfaces to take up the moisture expressed from the veneers by the pressure to which they are subjected; and, third, in an improved manner of insuring an exact conformity of one mold or die to the other, consisting in applying to the surface of one a material in a plastic condition and subjecting the same, while thus coated, to the pressure of the opposite die, whereby the plastic surface is caused to conform precisely to the form of such die, after which the hardening of the material is effected by natural or artificial means.

Referring to the accompanying drawings, Figures 1, 2, and 3 represent vertical cross-sections of my dies with material under treatment therein. Fig. 4 is a similar view, illustrating the manner of perfecting the form of the dies.

In my original Letters Patent I described a method of constructing a boat consisting in placing several veneers with diversified grain and coated with adhesive material, one upon another, between two dies and subjecting them to pressure therefrom until they were bent, set, and permanently united one with another.

In practice I have found that, owing to the extreme difficulty in producing large dies which will conform exactly one to another, to slight variations in the thickness of the veneers, to differences in the softness of the wood at different points, and to other causes, there was great difficulty in causing the several layers of veneers to adhere tightly to each other at all points. To overcome this difficulty I employ within the dies felt blankets, rubber sheets, or sheets of other suitable elastic material. In practice I usually place within the dies two sets or series of veneers, designed to form two sides of a boat. Each set or series will consist of two, three, or more veneers to be united with each other. The preferred method of employing the elastic sheet is to introduce the same between the two series of veneers, thus causing each series to rest on one side against the elastic cushion and on the opposite side against one of the dies. This arrangement is represented in Fig. 1, in which A and B represent two dies, and C and D the two series of veneers bearing against the respective dies, and E the elastic sheet introduced between the two series of veneers.

In some cases I introduce between the dies a single set or series only of veneers designed to form but one side of a boat. When this course is pursued the blankets will be placed upon both sides of the veneer, as shown at E E, Fig. 2, between the veneers and the die; or a single blanket may be employed on one side of the veneer only, as represented in Fig. 3. When the sheet is employed between the surface of the die and the surface of the veneer it may be cemented or otherwise secured permanently in place upon the die; but the best results are secured when the sheet is introduced loosely, in order that it may be free to seat itself smoothly upon the surface of the die when subjected to compression thereby. Practical experience has demonstrated that by the use of the yielding sheets a perfect union of the several veneers may be obtained throughout their entire area. When the veneers were subjected in the mold or dies to the high pressure required to set them permanently in form much trouble was formerly caused by the presence of the moisture which was expelled by the pressure. Unless removed, this moisture frequently prevented the proper union of the sheets, and in many cases affected the mold injuriously. In order, therefore, that the proper union of the sheets may not be defeated, it is necessary that provision shall be made for effectively and expeditiously removing this moisture. This result is secured by employing between the dies, on one or both sides of the veneer, a sheet or layer of absorbent material. The particular material employed for this purpose is not important, provided it is of such character as to readily absorb and retain the moisture. I find that the best results are secured by making use of a blanket of felt or equivalent material, which serves not only the purpose of an absorbent but also that of a cushion, as previously described. While therefore it is preferred to make use of the felt for the double purpose of affording pressure and of effecting the removal of the moisture, it is to be distinctly understood that application of the yielding pressure and the absorption of the moisture may be effected independently of each other. For example, a rubber sheet which is non-absorbent may be employed upon one side of the veneers for the purpose of affording an elastic pressure, while a sheet of fine wire-gauze, fine perforated metal, or equivalent non-elastic material may be employed on the opposite side to permit the escape of the moisture.

Owing to the fact that dies or molds for the purposes herein named require to be of considerable width and of a length of many feet, it has been found necessary to construct them, under ordinary circumstances, of wood, building them of numerous pieces laid together in diverse directions, so as to cross one another, as shown. Owing to the expansion and contraction of the wood, and various other causes unnecessary to detail, it is found that there is great difficulty in constructing the two dies so that the operative surface of one will conform exactly to that of the other. Again, it is found that in the event of the dies changing form in the slightest degree it is frequently impossible after correcting the defects in the one to effect a corresponding correction of those in the other. It is therefore highly desirable that some cheap and simple provision shall be made for giving the surface of one die precisely the same form as that of the other. This I effect, as shown in Fig. 4, by applying to the surface of the die which is to be corrected a thin coating or layer of plaster-of-paris, shellac, or other material susceptible of being hardened in a plastic condition. While this material is still in the condition named the opposite die is brought down thereon, whereby the material is caused to conform exactly to its surface. The second die is then removed and the material permitted to dry and harden, or hardened by artificial means if its nature is such as to require it. The result of this operation is two dies which conform one to the other with the utmost precision.

I am aware that it has been proposed to combine with a single mold or die, as a means of heating and applying pressure to the material to be bent, a chamber containing a body of heated water or equivalent fluid covered with a sheet of flexible material receiving support from the fluid behind it. This I do not claim. In the practical operation of constructing boats upon my plan it is necessary to apply to the molds a pressure amounting to many tons. This cannot be secured by an arrangement such as above referred to, experience having demonstrated that it is necessary to employ as the molding medium two rigid counterparts or dies and a thin elastic sheet which shall receive direct and rigid support throughout its entire surface.

Having thus described my invention, what I claim is—

1. As an improvement in the art of manufacturing laminated hulls for boats, the method of effecting the union of the laminæ with each other, consisting in subjecting the same, while coated with adhesive material, to pressure between two dies, which are counterparts of each other, and an interposed elastic surface, substantially as described.

2. As an improvement in the art of manufacturing laminated hulls for boats, the method of effecting a union between the several laminæ coated with adhesive material, consisting in subjecting the same to the action of an elastic surface, an absorbent surface, and the pressure of suitably-formed dies.

3. As an improvement in the art of manufacturing laminated bodies, the process consisting in placing one or more of veneers and one or more blankets of felt or equivalent elastic and absorbent material between two suitably-formed dies, and subjecting them to pressure thereby.

4. In combination with a pair of dies adapted for pressing veneers into suitable form for hulls or parts of hulls, a blanket of felt or equivalent elastic material located between said dies.

5. The improved pair of dies for the manufacture of laminated wooden hulls for boats, consisting of the two parts or sections built up of wood in the manner described, and of the coating of plastic material applied to the surface of one of said sections, substantially as and for the purpose described.

EDWARD G. DURANT.

Witnesses:
JOHN F. BICKEL,
CHARLES BROTHERTON.